(12) United States Patent
Sokolov et al.

(10) Patent No.: US 6,959,430 B2
(45) Date of Patent: Oct. 25, 2005

(54) SPECIALIZED HEAPS FOR CREATION OF OBJECTS IN OBJECT-ORIENTED ENVIRONMENTS

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 642 days.

(21) Appl. No.: 09/852,410

(22) Filed: May 9, 2001

(65) Prior Publication Data

US 2004/0015850 A1 Jan. 22, 2004

(51) Int. Cl.$^7$ ............................................. G06F 9/45
(52) U.S. Cl. ....................................... 717/118; 717/151
(58) Field of Search ................................ 717/118, 151, 717/108, 116

(56) References Cited

U.S. PATENT DOCUMENTS

| | | | |
|---|---|---|---|
| 6,018,793 A | | 1/2000 | Rao |
| 6,286,016 B1 | | 9/2001 | Heller et al. |
| 6,295,594 B1 | | 9/2001 | Meier |
| 6,349,344 B1 | * | 2/2002 | Sauntry et al. ............. 719/332 |
| 6,363,468 B1 | * | 3/2002 | Allison ........................ 711/173 |
| 6,421,739 B1 | | 7/2002 | Holiday |
| 6,421,761 B1 | | 7/2002 | Arimilli et al. |
| 6,453,403 B1 | * | 9/2002 | Czajkowski ................. 711/170 |
| 6,480,862 B1 | * | 11/2002 | Gall .............................. 707/3 |
| 6,526,422 B1 | | 2/2003 | Flood et al. |

OTHER PUBLICATIONS

Benton et al., Compiling Standard ML to Java Bytecodes, 1998, ACM, p. 129–140.*
Linden, Just Java and Beyond, 1998, Sun Microsystems Press, 3$^{rd}$ Ed., p. 364.*
Microsoft Press, Microsoft Press Computer Dictionary, 1997, Microsoft Press, 3$^{rd}$ Ed., p. 91, 467.*
Deitel et al., Java How to Program, 1999, Prentice Hall, 3$^{rd}$ Ed., p. 12–13, 735.*
Steensgaard, Thread Specific Heaps for Multi Threaded Programs, 2000, ACM, p. 18–24.*
Seidl et al., Segregating Heap Objects by Reference Bahavior and Lifetime, 1998, ACM, p. 12–23.*
Boehm, H–J et al.: *Garbage Collection in an Uncooperative Environment*, Sep. 1988, Software Practice & Experience, John Wiley & Sons, Ltd., Chichester, Great Britain, vol. 18, No. 9, pp. 807–820. ISSN: 0038–0644. XP000001796.
Gay D. et al.: *Language Support for Regions*, May 2001, ACM Sigplan Notices, Association for Computing Machinery, New York, NY, pp. 70–80. XP002258853.
Seidl, M. and Zorn, B: *Segregating Heap Objects by Reference Behavior and Lifetime*, Nov. 1998, ACM Sigplan Notices, Association for Computing Machinery, New York, NY, vol. 33, No. 11, pp. 12–23. XP002165837.

(Continued)

*Primary Examiner*—John Chavis
(74) *Attorney, Agent, or Firm*—Beyer Weaver & Thomas, LLP (57) ABSTRACT

The present invention pertains to techniques for creating and maintaining objects in object-oriented environments. The techniques are especially well suited for Java programming environments. In accordance with one aspect of the invention, specialized Java heaps are disclosed. In contrast to conventional heaps, the specialized Java heap is designated for storing Java objects with similar traits in the same memory portion. As such, objects with similar traits can be allocated and maintained in a designated memory portion. Another aspect of the invention provides methods for allocating objects in the heap memory. These methods can be used to create and associate objects with similar traits in a specialized heap. As will be appreciated, objects can be created and maintained more efficiently in this manner. As a result, the performance of virtual machines, especially those operating with relatively limited resources (e.g., embedded systems), is improved.

21 Claims, 5 Drawing Sheets

OTHER PUBLICATIONS

Ungar, D. et al.: *Tenuring Policies for Generation–Based Storage Reclamation*, Sep. 1988, Proceedings of the Object Oriented Programming Systems Languages and Applications Conference (OOPSLA), San Diego, CA, Special Issue of Sigplan Notices, vol. 23, No. 11, pp. 1–17. XP000299812.

Wilson, Paul et al.: *Dynamic Storage Allocation: A Survey and Critical Review*, 1995, Proceedings of International Workshop on Memory Management, "Online!". XP002262845.

Lindholm et al, "The Java™ Virtual Machine Specification", (Sep., 1996), Sun Microsystems, Inc., Chapters 1–10 (173 pp.).

Microquill:Smartheap Technical Specification, Internet Document, 'Online! Sep. 19, 2000, http://web.archive.org/web/20000919050512/www.microquill.com/prod_sh/sh_tspec.htm.

Shuf et al., "Distinguishing Between Prolific and Non–Prolific Types for Efficient Memory Management," IBM Research Report, Apr. 5, 2001.

Vo, "Vmalloc: A General and Efficient Memory Allocator," Software Practice and Experience, vol. 26(3), 357–374, Mar. 1996.

Hanson, "Fast Allocation and Deallocation of Memory Based on Object Lifetimes," Software Practice and Experience, vol. 20(1), Jan. 5–12, 1990.

Nilsen, "Garbage Collection of Strings and Linked Data Structures in Real Time," Software Practice and Experience, vol. 18(7), 613–640, Jul. 1988.

Cohen, "Garbage Collection of Linked Data Structures," Computing Surveys, vol. 13, No. 3, Sep. 1981.

Bozman et al., "Analysis of Free–Storage Algorithms–Revisited," IBM Systems Journal, vol. 23, No. 1, 1984.

* cited by examiner

SPECIALIZED HEAPS FOR CREATION OF OBJECTS IN OBJECT-ORIENTED ENVIRONMENTS

BACKGROUND OF THE INVENTION

The present invention relates generally to object-based high level programming environments, and more particularly, to techniques for creating and maintaining objects in object oriented environments.

Recently, the Java™ programming environment has become quite popular. The Java™ programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation.

The Java virtual machine is commonly implemented in software by means of an interpreter for the Java virtual machine instruction set but, in general, may be software, hardware, or both. A particular Java virtual machine implementation and corresponding support libraries together constitute a Java™ runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java™ runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java™ Virtual Machine Specification Second Edition*, by Tim Lindholm and Frank Yellin, which is hereby incorporated herein by reference.

As an object-oriented programming language, Java utilizes the programming concept known as an object. In the Java programming environment, Java objects are created (instantiated) from Java classes. Typically, Java objects are stored in a heap memory portion (heap). A Java object in the heap can include a reference to its class, as well as one or more other fields describing data (e.g., variables) associated with the object. In addition, Java objects can include references to other Java objects.

During the execution of Java programs, some of the objects in the heap are no longer needed (i.e., become "dead objects" which are no longer reachable by the Java program). Accordingly, it is desirable to identify the "dead" objects and remove them from the heap. This operation can be referred to as "garbage collection."

Conventionally, Java objects are allocated and maintained in the heap memory portion without regard to their traits. These traits, for example, include the class, size, life span, number of fields, whether objects reference other objects amount of time, and so forth. It should be noted that creation (instantiation) of Java objects requires several operations to be performed at run time. These operations include finding an appropriate place in the heap memory portion, calling the appropriate constructor and so forth. Performing these operations requires use of system resources. Moreover, the conventional arrangement of Java objects in the heap may result in inefficient use of system resources, especially, for systems with limited memory and/or computing power (e.g., embedded systems). As will be appreciated, this is partially attributed to the fact that Java objects in the heap memory portion can vary widely.

It should also be noted that the conventional arrangement of the heap memory portion can also adversely effects the maintenance of the Java objects. This means that there is a need for relatively more complex garbage collection programs. Again, inefficient use of memory space and/or resources can result since garbage collection programs require more memory and computing power to operate. As a result, performance of virtual machines, especially those with limited resources is limited.

In view of the foregoing, improved techniques for creating and maintaining objects in object oriented environments are needed.

SUMMARY OF THE INVENTION

Broadly speaking, the present invention pertains to techniques for creating and maintaining objects in object-oriented environments. The techniques are especially well suited for Java programming environments. In accordance with one aspect of the invention, specialized Java heaps are disclosed. In contrast to conventional heaps, the specialized Java heap is designated for storing Java objects with similar traits in the same memory portion. As such, objects with similar traits can be allocated and maintained in a designated memory portion. Another aspect of the invention provides methods for allocating objects in the heap memory. These methods can be used to create and associate objects with similar traits in a specialized heap. As will be appreciated, objects can be created and maintained more efficiently in this manner. As a result, the performance of virtual machines, especially those operating with relatively limited resources (e.g., embedded systems), is improved.

The invention can be implemented in numerous ways, including as a method, an apparatus, a computer readable medium, and a database system. Several embodiments of the invention are discussed below.

As a Java heap suitable for storing Java objects therein, one embodiment of the invention includes at least one Java heap portion that is designated for storing Java objects with similar traits.

As a method for creating Java objects in a heap, one embodiment of the invention includes the acts of: translating a Java Bytecode into one or more commands, the Java Bytecode representing an instruction for creating a Java object, the one or more commands can operate to allocate the Java object in a portion of heap designated for the object; and executing the one or more commands to create the object in the portion of the heap associated with the object.

As a method for creating Java objects, another embodiment of the invention includes: compiling one or more commands suitable for allocation of Java objects; executing the one or more commands to allocate the Java objects in a designated portion of heap memory.

As a computer readable medium including computer program code for creating Java objects in a heap, one embodiment of the invention includes: computer program code for translating a Java Bytecode into one or more commands, the Java Bytecode representing an instruction for creating a Java object, and wherein the one or more commands can operate to allocate the Java object in a portion of heap designated for the object; and computer program code for executing the one or more commands to create the object in the portion of the heap associated with the object.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to techniques for creating and maintaining objects in object-oriented environments. The techniques are especially well suited for Java programming environments. In accordance with one aspect of the invention, specialized Java heaps are disclosed. In contrast to conventional heaps, the specialized Java heap is designated for storing Java objects with similar traits in the same memory portion. As such, objects with similar traits can be allocated and maintained in a designated memory portion. Another aspect of the invention provides methods for allocating objects in the heap memory. These methods can be used to create and associate objects with similar traits in a specialized heap. As will be appreciated, objects can be created and maintained more efficiently in this manner. As a result, the performance of virtual machines, especially those operating with relatively limited resources (e.g., embedded systems), is improved.

Embodiments of the invention are discussed below with reference to FIGS. 1–5. However, those skilled in the art will readily appreciate that the detailed description given herein with respect to these figures is for explanatory purposes as the invention extends beyond these limited embodiments.

Figure 1:
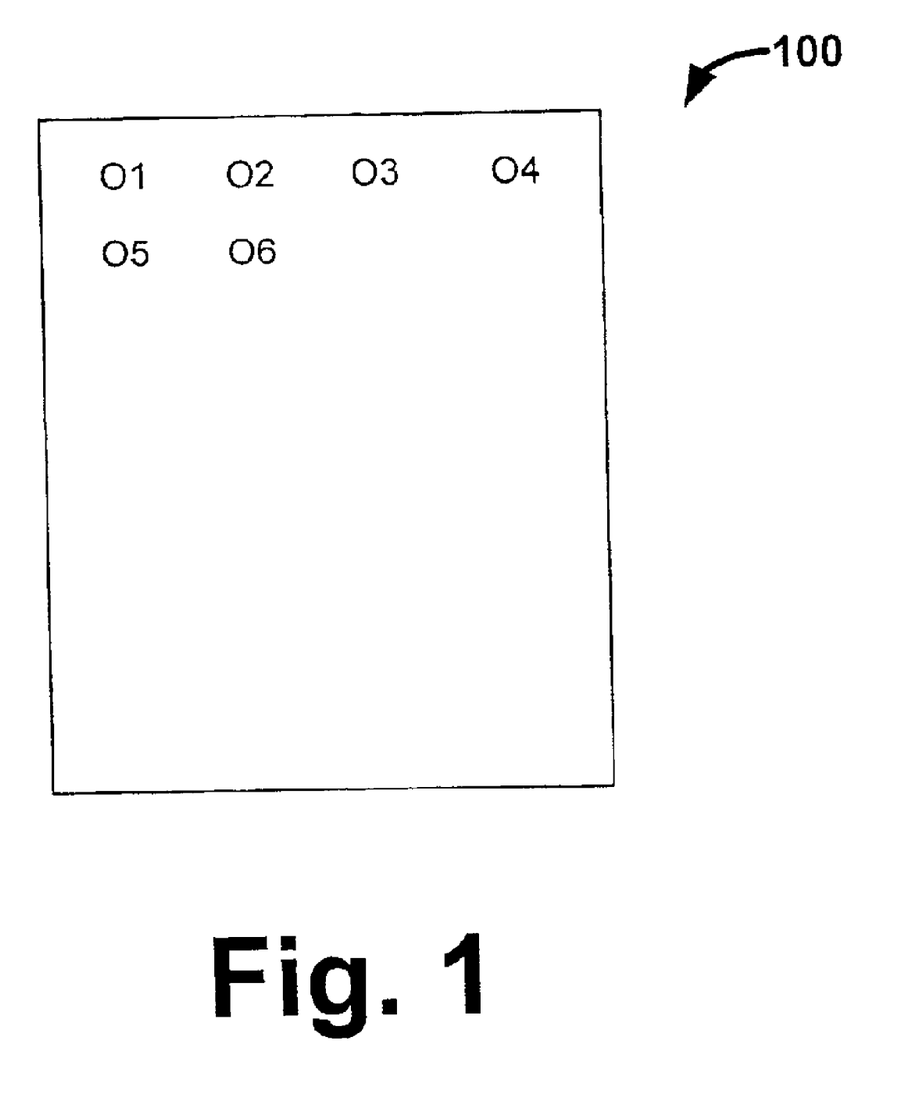
FIG. 1 represents a specialized Java heap in accordance with one embodiment of the invention.

FIG. 1 represents a specialized Java heap 100 in accordance with one embodiment of the invention. The specialized Java heap 100 can be implemented in a portion of the heap memory. Alternatively, the specialized Java heap 100 can take up the entire heap memory dedicated for creation of objects. In any case, the specialized Java heap is designated to store objects with similar traits. The traits for objects can be defined based on different system requirements. However, these traits can, for example, include the class, size, number of fields, life span, simplicity of the objects (e.g., whether objects reference other objects), and so forth.

Accordingly, objects with one or more similar traits can be stored in the specialized Java heap 100. In the described embodiment, objects $O_1$, $O_2$, $O_3$, $O_4$, $O_5$ and $O_6$ have been stored in the specialized Java heap 100. The objects $O_1$, $O_2$, $O_3$, $O_4$, $O_5$ and $O_6$ have a similar trait (e.g., have the same class). As will be appreciated, the specialized Java heap 100 offers several advantages. One advantage is that allocation of objects can be achieved more efficiently. Another advantage is that the specialized Java heap 100 can be maintained more easily. As result, maintenance and garbage collection of the heap can be performed more efficiently.

Figure 2:
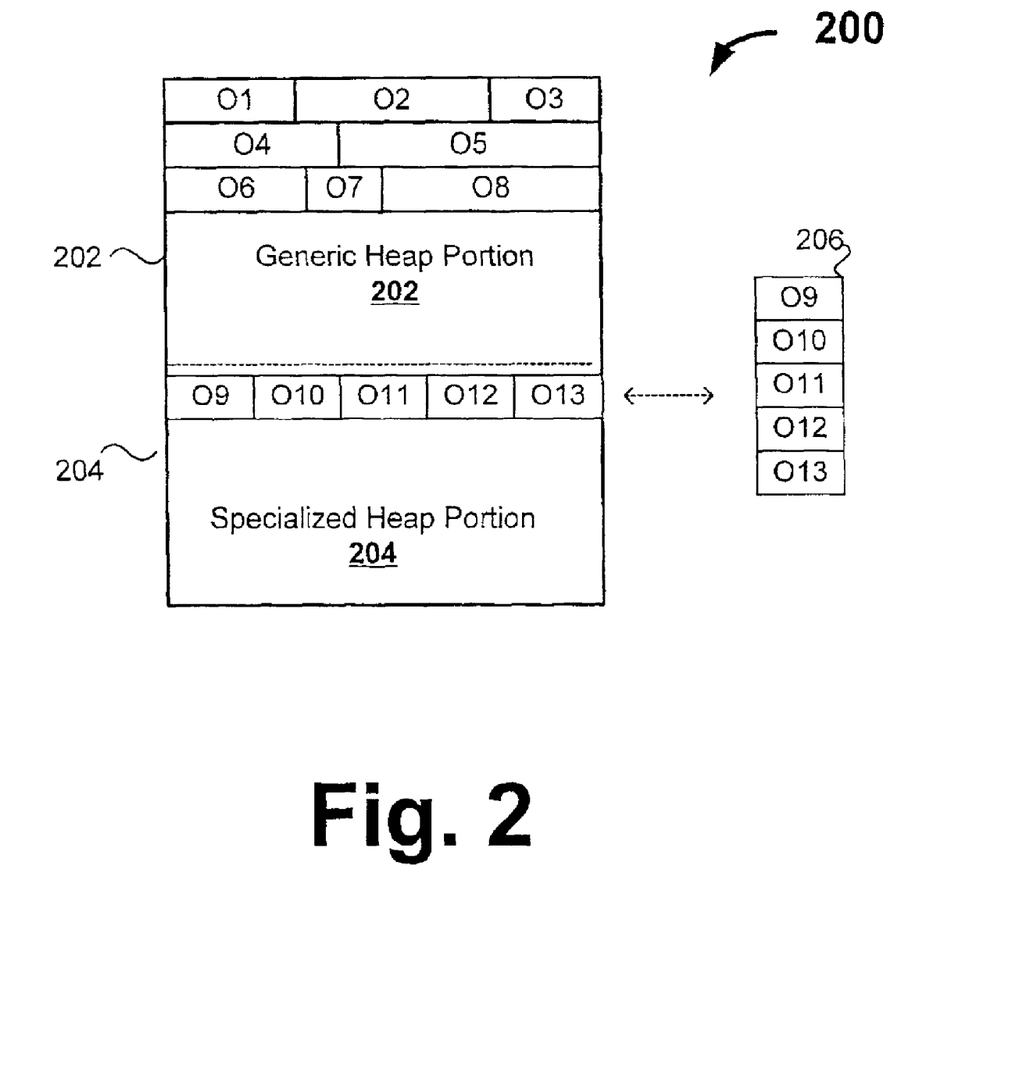
FIG. 2 represents a Java heap in accordance with another embodiment of the invention.

As will be appreciated, the invention anticipates partitioning the heap into separate portions, whereby one or more specialized Java heaps are utilized. Accordingly, the Java heaps can be organized based on various system requirements. Thus, virtually unlimited embodiments of the invention are possible. To illustrate, FIG. 2 represents a Java heap 200 in accordance with one embodiment of the invention. As shown in FIG. 2, the Java heap 200 has been partitioned into two separate heap portions, namely, a generic Java heap portion 202 and a specialized Java heap portion 204. The generic Java heap portion 202 can, for example, be implemented similar to conventional Java heaps. In other words, objects of various traits can be stored in the Java heap portion 202 (e.g., $O_1$, $O_2$, $O_3$ . . . $O_8$).

The heap portion 204, however, is a specialized heap portion suitable for storing objects with similar traits (e.g., objects of the same size). As such, the heap portion 204 is implemented as an array of a predetermined size. In other words, the objects $O_9$, $O_{10}$, $O_{11}$, $O_{12}$ and $O_{13}$ can, for example, represent objects respectively stored in offsets 0, 1, 2, 3, and 5 of an array 206. As will be appreciated, an array implementation allows for more efficient allocation of objects because the size of the objects can be predetermined (i.e., can be known at compile time). In addition, garbage collection can be improved partially because of the simplicity that the array organization offers.

Figure 3:
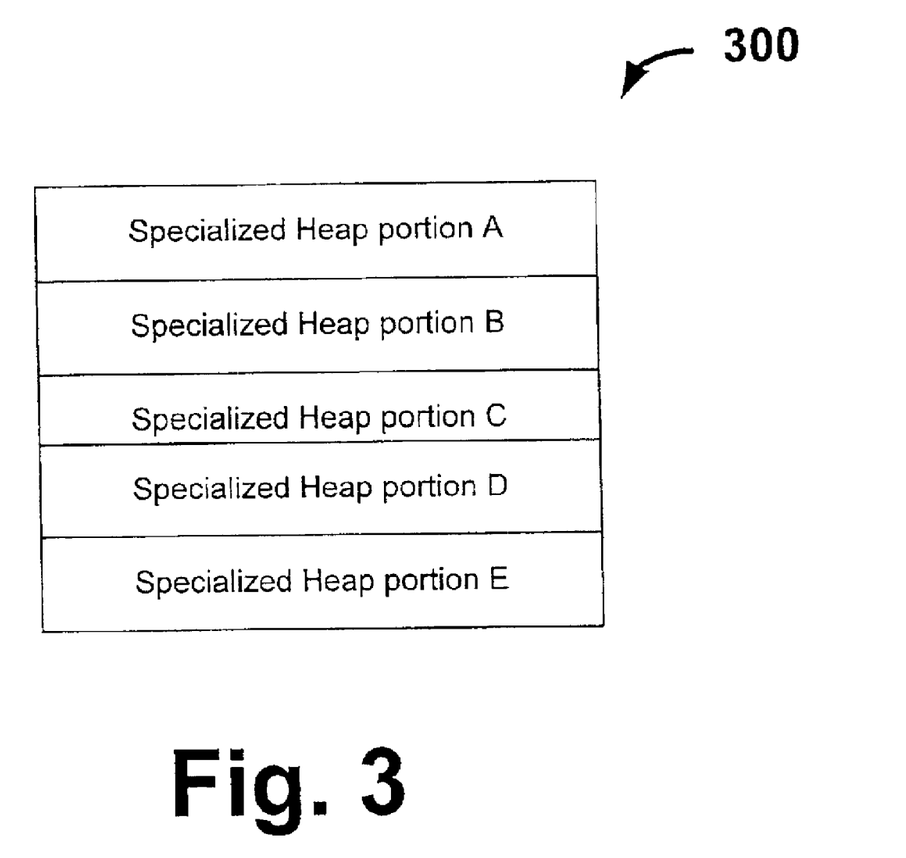
FIG. 3 illustrates a Java heap that has been partitioned into a plurality of specialized Java heap portions.

FIG. 3 represents a Java heap 300 in accordance with another embodiment of the invention. As shown in FIG. 3, the Java heap 300 has been partitioned into a plurality of specialized Java heap portions, namely, the specialized Java heap portions A, B, C, D and E. Each of these specialized Java heap portions can be used to store objects with similar traits. By way of example, specialized Java heap portion A can store Java objects with the same class, specialized Java heap portion B can be used to store objects of the same size, specialized Java heap portion C can be used to store objects with relatively long life spans, specialized Java heap portion D can be used to store objects that do not reference other objects, and so forth. In this manner, a Java heap portion can be partitioned into a plurality of specialized heaps.

Figure 4:
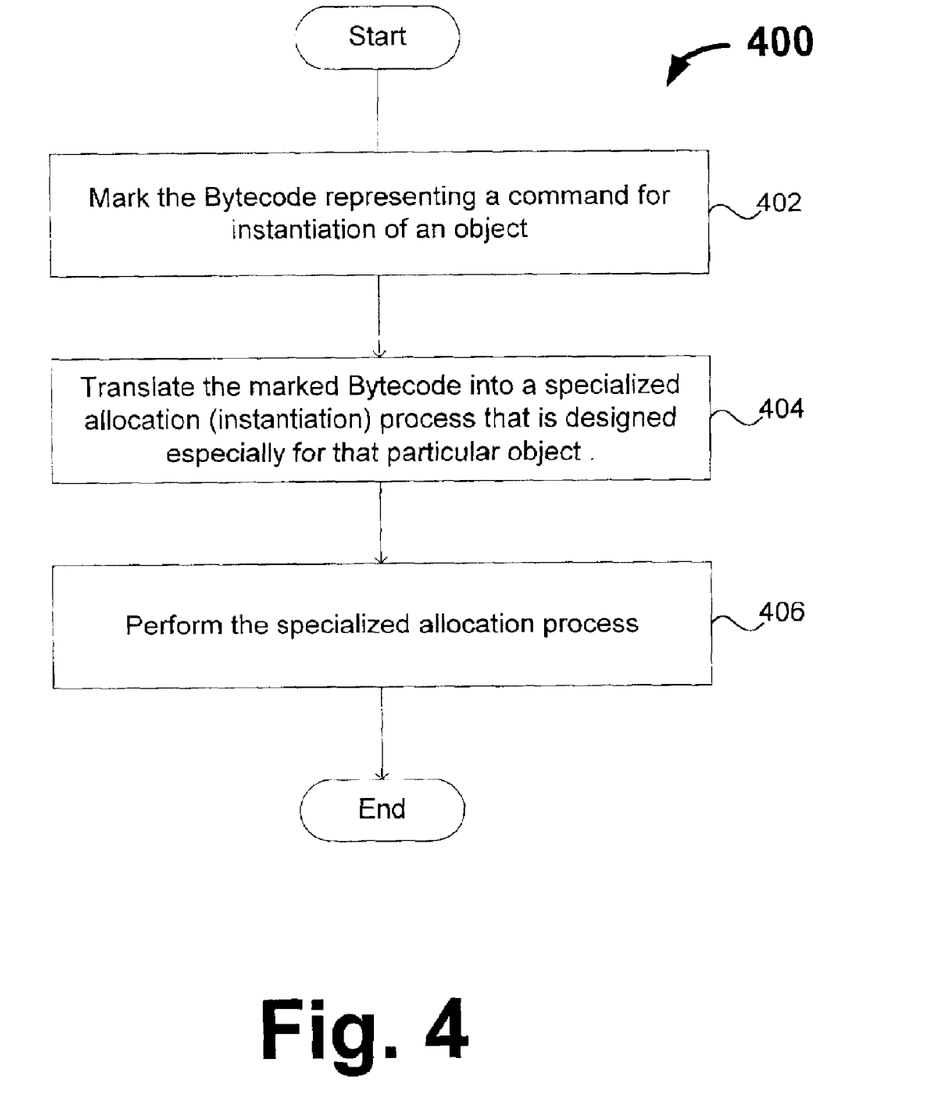
FIGS. 4 and 5 illustrate a method for creating objects in accordance with one embodiment of the invention.
Figure 5:
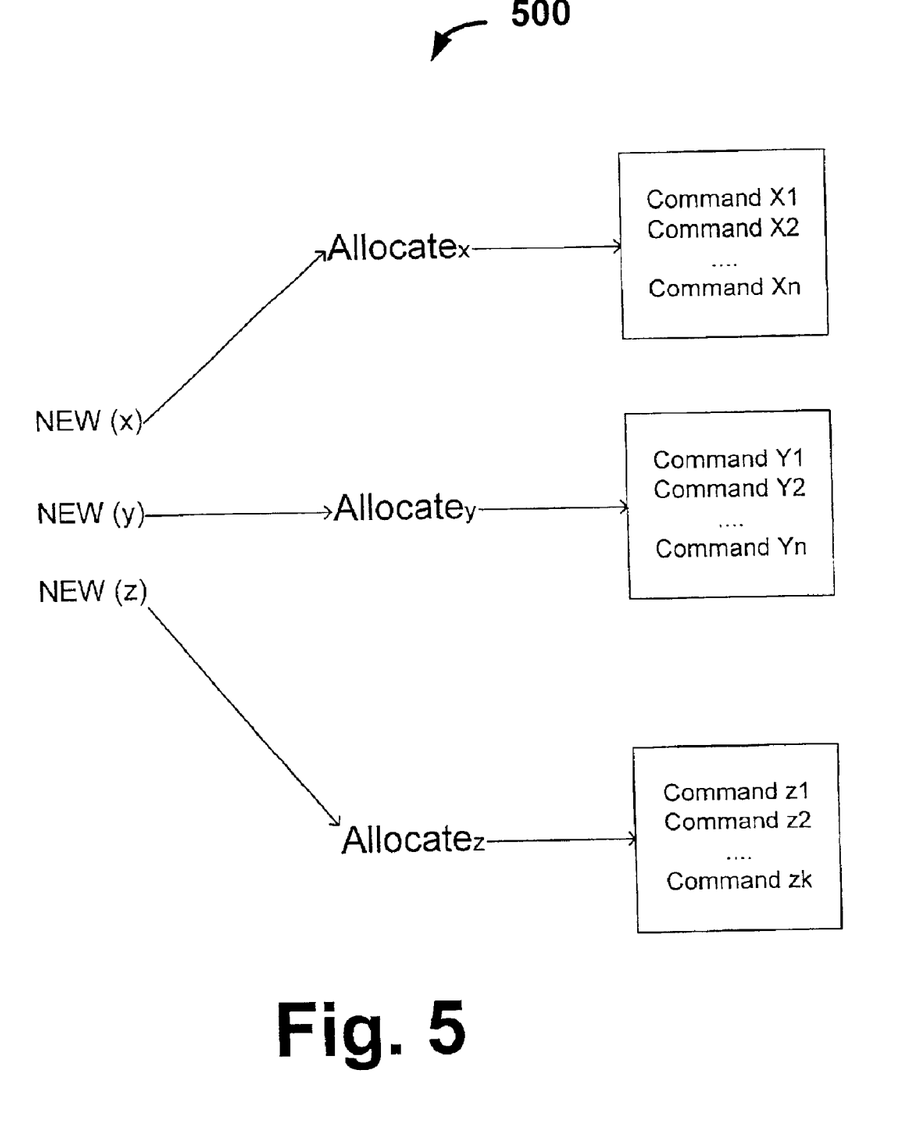

As noted above, the invention provides for methods suitable for creation of specialized heaps. To illustrate, FIG. 4 represents a method for creating objects in accordance with one embodiment of the invention. The method 400 can be used to create objects with similar traits in a specialized heap. Initially, at operation 402, a Bytecode that represents a command for instantiation (or creation) of an object is marked. As will be appreciated, the marking performed at operation 402 can be done at compile time. In other words, conventional Bytecodes that are known to create a particular object can be marked at compile time. The marked Bytecode can, for example, be a "New" Bytecode command that is used to create objects. Typically, the object is an object with a trait that is of interest. For example, the object may be of a type that is known to take up a significant amount of heap memory, or have a long life span, and so forth.

Next, at operation 404, the marked Bytecode is translated into a specialized allocation (instantiation) process that is designed especially for the particular object that is of interest. By way of example, referring now to FIG. 5, a conventional New(x) Bytecode command suitable for instantiating objects of class X can be translated into an Allocate$_x$, which represents one or more especially designed commands (commandX$_1$-commandX$_n$) suitable for allocating objects of class X in a specialized heap designated for the class X, while a conventional New(y) Bytecode command suitable for instantiating objects of class Y can be translated into an Allocate$_y$, which represents one or more especially designed commands (commandY$_1$-commandY$_m$) suitable for allocating objects of class Y in a specialized heap designated for the class Y, and so forth. As will be appreciated, since information relating to the object and its allocation in the heap can be known at compile time, specialized commands can be compiled so that they can be executed more efficiently. As a result, objects can be instantiated more efficiently. This, in turn, improves the performance of virtual machines.

Referring back to FIG. 4, at operation 406, the specialized allocation process is performed. The specialized allocation process operates to create the object in a specialized heap that is designated for that object. As noted above, the one or more commands associated with the specialized allocation process can be executed efficiently during execution time. As a result, some of the operations that are conventionally performed at run time to allocate objects can be bypassed.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for creating Java objects in a heap memory which is used by a virtual machine, said method comprising:
   generating, by said virtual machine, a plurality of d signated Java heap portions which are each designated for storing objects that have similar class-traits, wherein said plurality of designated Java heaps include a first designated heap portion that is designated to store objects associated with a first class name, and a second designated heap portion that is designated to store objects associated with a second class name, and wherein said first and second class names are different;
   receiving, by said virtual machine, a Java Bytecode that represents an instruction for creating a first Java object of said first class name;
   translating, by said virtual machine, said Java Bytecode into one or more commands, wherein said one or more commands can operate to allocate said first Java object in said first designated heap portion; and
   receiving, by said virtual machine, another Java Bytecode representing an instruction for creating a second Java object of said second class name;
   translating, by said virtual machine, said other Java Bytecode into one or more other commands, and wherein said one or more other commands can operate to allocate said second Java object in said second designated heap portion;
   executing, by said virtual machine, said one or more commands to create said first object in said first designated heap portion; and
   executing said other one or more commands to create said second object in said second designated heap portion.

2. A method as recited in claim 1, wherein each of said plurality of Java heap portions is designated for storing Java objects with similar traits.

3. A method as recited in claim 1, wherein each of said plurality of Java heap portions is designated to store objects of the same size.

4. A method as recited in claim 1, wherein said first designated Java heap portion is implemented as an array.

5. A method as recited in claim 1, wherein said first designated Java heap portion is designated to store objects with similar life spans.

6. A Java computing environment as recited in claim 1, wherein said first designated Java heap portion is designated to store objects that do not reference other objects.

7. A method as recited in claim 1, wherein said method further comprises:
   marking a Java Bytecode representing an instruction for creating a Java object.

8. A method as recited in claim 7,
   wherein said marking is performed at compile time; and
   wherein said one or more commands are created at compile time.

9. A method as recited in claim 1,
   wherein said first designated portion of the heap is designated for allocation of objects with similar traits; and
   wherein objects that do not have similar traits as said objects are not allocated in said first designated portion of the heap.

10. A computer system for creating Java objects in a heap memory which is used by a virtual machine, comprising:
    at least one processor;
    at least one heap memory; and
    a virtual machine which is capable of:
        generating a plurality of designated Java heap portions which are each designated for storing objects that have similar class-traits, wherein said plurality of designated Java heaps include a first designated heap portion that is designated to store objects associated with a first class name, and a second designated heap portion that is designated to store objects associated with a second class name, and wherein said first and second class names are different;
        receiving a Java Bytecode that represents an instruction for creating a first Java object of said first class name;
        translating said Java Bytecode into one or more commands, wherein said one or more commands can operate to allocate said first Java object in said first designated heap portion; and
        receiving, another Java Bytecode representing an instruction for creating a second Java object of said second class name;
        translating said other Java Bytecode into one or more other commands, and wherein said one or more other commands can operate to allocate said second Java object in said second designated heap portion;
        executing said one or more commands to create said first object in said first designated heap portion; and
        executing said other one or more commands to create said second object in said second designated heap portion.

11. A computer system as recited in claim 10, wherein each of said plurality of Java heap portions is designated for storing Java objects with similar traits.

12. A computer system as recited in claim 10, wherein each of said plurality of Java heap portions is designated to store objects of the same size.

13. A computer system as recited in claim 10, first designated Java heap portion is implemented as an array.

14. A computer system as recited in claim 10, wherein said first designated Java heap portion is designated to store objects with similar life spans.

15. A computer system as recited in claim 10, wherein said first designated Java heap portion is designated to store objects that do not reference other objects.

16. A computer readable medium including at least computer program code for creating Java objects in a heap memory which is used by a virtual machine, comprising:

computer program code for generating, by said virtual machine, a plurality of designated Java heap portions which are each designated for storing objects that have similar class-traits, wherein said plurality of designated Java heaps include a first designated heap portion that is designated to store objects associated with a first class name, and a second designated heap portion that is designated to store objects associated with a second class name, and wherein said first and second class names are different;

computer program code for receiving, by said virtual machine, a Java Bytecode that represents an instruction for creating a first Java object of said first class name;

computer program code for translating, by said virtual machine, said Java Bytecode into one or more commands, wherein said one or more commands can operate to allocate said first Java object in said first designated heap portion; and computer program code for receiving, by said virtual machine, another Java Bytecode representing an instruction for creating a second Java object of said second class name;

computer program code for translating, by said virtual machine, said other Java Bytecode into one or more other commands, and wherein said one or more other commands can operate to allocate said second Java object in said second designated heap portion;

computer program code for executing, by said virtual machine, said one or more commands to create said first object in said first designated heap portion; and computer program code for executing, by said virtual machine, said other one or more commands to create said second object in said second designated heap portion.

17. A computer readable medium as recited in claim 16, wherein each of said plurality of Java heap portions is designated for storing Java objects with similar traits.

18. A computer readable medium as recited in claim 16, wherein each of said plurality of Java heap portions is designated to store objects of the same size.

19. A computer readable medium as recited in claim 16, first designated Java heap portion is implemented as an array.

20. A computer readable medium as recited in claim 16, wherein said first designated Java heap portion is designated to store objects with similar life spans.

21. A computer readable medium as recited in claim 16, wherein said first designated Java heap portion is designated to store objects that do not reference other objects.

* * * * *

UNITED STATES PATENT AND TRADEMARK OFFICE
CERTIFICATE OF CORRECTION

PATENT NO. : 6,959,430 B2  
DATED : October 25, 2005  
INVENTOR(S) : Sokolov et al.

It is certified that error appears in the above-identified patent and that said Letters Patent is hereby corrected as shown below:

Column 5,  
Line 40, delete "d" at end of line.  
Line 41, change "signated" to -- designated --.

Signed and Sealed this

Sixteenth Day of May, 2006

JON W. DUDAS  
*Director of the United States Patent and Trademark Office*